US011473933B2

(12) United States Patent
Heizenroeder

(10) Patent No.: US 11,473,933 B2
(45) Date of Patent: Oct. 18, 2022

(54) METERS HAVING INTEGRATED PRESSURE REGULATORS AND RELATED METHODS AND SYSTEMS

(71) Applicant: Sensus Spectrum, LLC, Morrisville, NC (US)

(72) Inventor: Christian Heizenroeder, Durham, NC (US)

(73) Assignee: Sensus Spectrum, LLC, Morrisville, NC (US)

( * ) Notice: Subject to any disclaimer, the term of this patent is extended or adjusted under 35 U.S.C. 154(b) by 0 days.

(21) Appl. No.: 16/520,481

(22) Filed: Jul. 24, 2019

(65) Prior Publication Data

US 2021/0025733 A1 Jan. 28, 2021

(51) Int. Cl.
 *G01D 4/00* (2006.01)
 *G01D 4/14* (2006.01)
 *G01L 19/00* (2006.01)
(52) U.S. Cl.
 CPC ............ *G01D 4/004* (2013.01); *G01D 4/14* (2013.01); *G01L 19/0092* (2013.01)

(58) Field of Classification Search
None
See application file for complete search history.

(56) References Cited

U.S. PATENT DOCUMENTS

| 2016/0216713 | A1* | 7/2016 | Mudd | F16K 37/005 |
| 2017/0085966 | A1* | 3/2017 | Berkcan | G01F 15/075 |
| 2018/0292248 | A1 | 10/2018 | Heizenroeder | |
| 2020/0263805 | A1 | 8/2020 | Heizenroeder | |

OTHER PUBLICATIONS

International Search Report and Written Opinion, PCT/US2020/042734, dated Oct. 13, 2020, 10 pages.

* cited by examiner

*Primary Examiner* — Adolf Dsouza
(74) *Attorney, Agent, or Firm* — Stanek Lemon Crouse & Meeks, PA

(57) ABSTRACT

Gas meters are provided including a housing and a pressure regulator integrated with the housing. The pressure regulator is configured to adjust pressure of gas flowing through the gas meter responsive to a signal from a remote location or automatically based on a predetermined pressure threshold programmed into the gas meter.

14 Claims, 7 Drawing Sheets

METERS HAVING INTEGRATED PRESSURE REGULATORS AND RELATED METHODS AND SYSTEMS

FIELD

The present inventive concept relates generally to meters and, more particularly, to remotely controlling meters.

BACKGROUND

Regulating pressure in a meter, for example, a gas meter or a water meter, is currently a manual process that typically requires a lot of resources and manpower. In particular, when the water or gas pressure needs to be adjusted, a contractor is typically hired to come to the house, hook up a sensor (pressure sensor) to the meter and adjust the pressure to a desired level by, for example, adjusting the pressure regulation valve (PRV).

SUMMARY

Some embodiments of the present inventive concept provide gas meters including a housing and a pressure regulator integrated with the housing, wherein the pressure regulator is configured to adjust pressure of gas flowing through the gas meter responsive to a signal from a remote location or automatically based on a predetermined pressure threshold programmed into the gas meter.

In further embodiments, the gas meter may further include a pressure sensor configured to sense pressure of gas flowing through the gas meter. The pressure regulator may be configured to automatically adjust the pressure of gas flowing through the gas meter based on a comparison of the sensed pressure of the gas flowing through the gas meter and the predetermined pressure threshold.

In still further embodiments, the gas meter may further include a shut off valve coupled to the pressure sensor. The shut off valve may be configured to turn the gas meter off and/or on remotely responsive to the sensed pressure or the signal from the remote location.

In some embodiments, the gas meter may further include an electronics module configured to receive sensor information including the sensed pressure and process the received sensor information; and a radio module configured to receive the processed sensor information from the electronics module, communicate the processed sensor information to a remote location and receive pressure adjustment information from the remote location, the received pressure adjustment information being used to adjust gas pressure in the gas meter.

In further embodiments, the gas meter further includes a temperature sensor. The electronics module may be further configured to receive temperature information from the temperature sensor and process the received temperature information along with the received pressure information.

In still further embodiments, the received pressure adjustment information may instruct the electronics module to one of increase pressure of the gas flowing through the gas meter; decrease pressure of the gas flowing through the gas meter, and shut off the gas flowing through the gas meter.

In some embodiments, the electronic module may be further configured to store the received pressure information and process the received pressure information to provide the processed pressure information to the remote location via the radio module.

In further embodiments, the radio module may be one of inside the housing of the gas meter and separate from the housing of the gas meter.

Still further embodiments of the present inventive concept provide pressure regulating systems including a gas meter housing; a pressure regulator integrated with the gas meter housing; a pressure sensor configured to sense pressure of gas flowing through a gas meter; and an electronics module configured to receive sensor information including the sensed pressure and process the received sensor information. The pressure regulator is configured to automatically adjust the pressure of gas flowing through the gas meter based on a comparison of the sensed pressure of the gas flowing through the gas meter and a predetermined pressure threshold.

Some embodiments of the present inventive concept provide methods of adjusting pressure in a gas meter having an integrated pressure regulator including sensing pressure of gas flowing through a gas meter using the integrated pressure regulator; comparing the sensed pressure to a predetermined pressure threshold to provide a comparison result; and adjusting the pressure of the gas flowing through the gas meter based on the comparison result.

DETAILED DESCRIPTION

Figure 1:
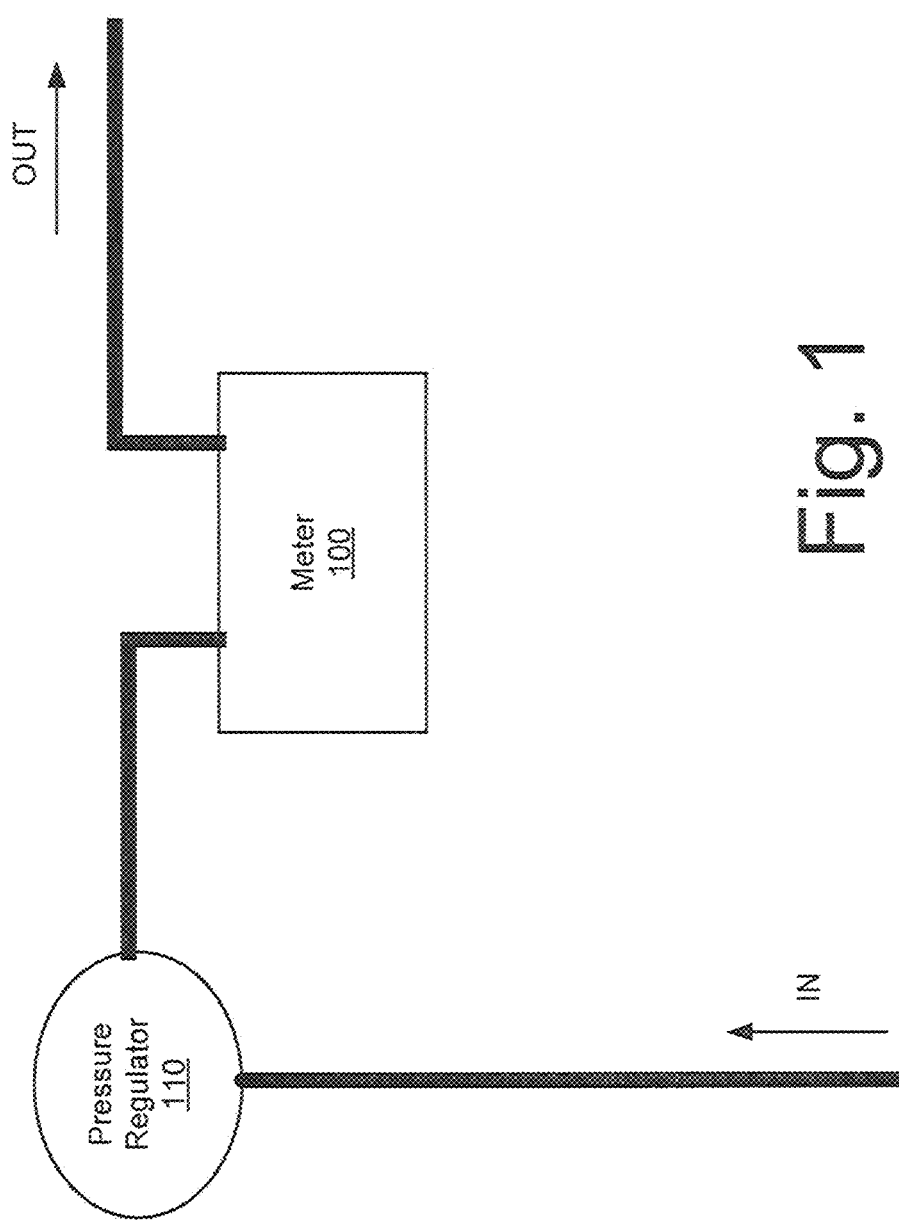
FIG. 1 is a block diagram of a conventional system including a meter separate from the pressure regulator.

The present inventive concept will be described more fully hereinafter with reference to the accompanying figures, in which embodiments of the inventive concept are shown. This inventive concept may, however, be embodied in many alternate forms and should not be construed as limited to the embodiments set forth herein.

Accordingly, while the inventive concept is susceptible to various modifications and alternative forms, specific embodiments thereof are shown by way of example in the drawings and will herein be described in detail. It should be understood, however, that there is no intent to limit the inventive concept to the particular forms disclosed, but on the contrary, the inventive concept is to cover all modifications, equivalents, and alternatives falling within the spirit and scope of the inventive concept as defined by the claims. Like numbers refer to like elements throughout the description of the figures.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises", "comprising," "includes" and/or "including" when used in this specification, specify the presence of stated features, integers, steps, operations, elements, and/or components, but do not preclude the presence or addition of one or more other features, integers, steps, operations, elements, components, and/or groups thereof. Moreover, when an element is referred to as being "responsive" or "connected" to another element, it can be directly responsive or connected to the other element, or intervening elements may be present. In contrast, when an element is referred to as being "directly responsive" or "directly connected" to another element, there are no intervening elements present. As used herein the term "and/or" includes any and all combinations of one or more of the associated listed items and may be abbreviated as "/".

Unless otherwise defined, all terms (including technical and scientific terms) used herein have the same meaning as commonly understood by one of ordinary skill in the art to which this inventive concept belongs. It will be further understood that terms used herein should be interpreted as having a meaning that is consistent with their meaning in the context of this specification and the relevant art and will not be interpreted in an idealized or overly formal sense unless expressly so defined herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element without departing from the teachings of the disclosure. Although some of the diagrams include arrows on communication paths to show a primary direction of communication, it is to be understood that communication may occur in the opposite direction to the depicted arrows.

As discussed above, regulating pressure at customer location is currently done by an onsite contractor that physically changes the gas or water pressure at the customer site. In other words, conventionally, the physical meter is separate from the pressure regulator and they are not physically integrated as illustrated in FIG. 1. This can be very expensive and time consuming. Accordingly, some embodiments of the present inventive concept provide a pressure regulator in the meter itself that can be remotely controlled. Provision of the pressure regulator in the meter itself may reduce the cost of sending out a contractor to adjust the pressure. Meters as discussed herein can be used by, for example, utilities at various locations. The ability to monitor and control, for example, gas pressure remotely, can provide a much safer environment because an increased pressure can be detected and reduced automatically.

Although embodiments of the present inventive concept are discussed herein with respect to gas meters, embodiments of the present inventive concept are not limited to this configuration. Furthermore, in addition to including the pressure regulator in the meter itself, embodiments of the present inventive concept may also provide a "pressure regulating system." As used herein, a "pressure regulating system" refers to one or more elements associated with a meter or network of meters that allows pressure to be increased and/or decreased from a remote location based on information received related to pressure in the network. For example, in some embodiments of the present inventive concept, pressure may be automatically and/or remotely regulated. In particular, in some embodiments, a command may be sent from a remote location to the meter indicating that the pressure in the meter should be kept at, for example, 1.0 pound per square inch (PSI). The meter including the pressure regulator may automatically adjust the pressure in the meter to keep the pressure at 1.0 PSI. In some embodiments, parameters in the meter may be preset to maintain a particular PSI or range of pressures, for example, between 1 and 2 PSI. An optional shut off valve may also be included in some embodiments of the present inventive concept. Accordingly, meters discussed herein include a pressure regulator and may be including in a pressure regulating system that allows remote control of pressure in the meter including the ability to shut the meter off if pressure is, for example, dangerously high as will be discussed further below with respect to FIGS. 1 through 7.

FIG. 1 illustrates a conventional system including a meter 100 separate from the pressure regulator 110. Thus, as discussed above, in this system, the pressure in the meter 100 may be manually adjusted using the pressure regulator 110.

Figure 2:
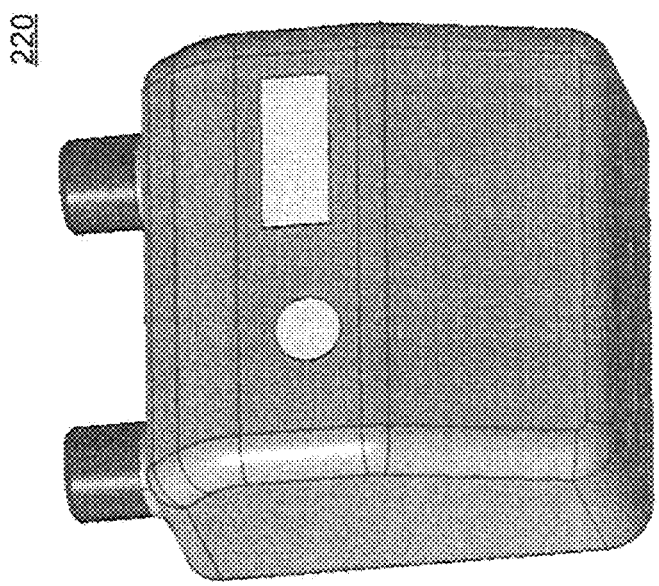
FIG. 2 is a diagram illustrating an exterior of a meter including a pressure regulator in accordance with some embodiments of the present inventive concept.

In contrast, in accordance with embodiments of the present inventive concept, the pressure regulator is positioned in the meter housing and is integrated with the meter. FIG. 2 is an example meter housing 220. From the exterior housing of the meter 220, there is no obvious indication that the meter 220 includes the pressure regulator, optional shut off valve, sensors, radio board or the like that many be included in the pressure regulating system.

Figure 3:
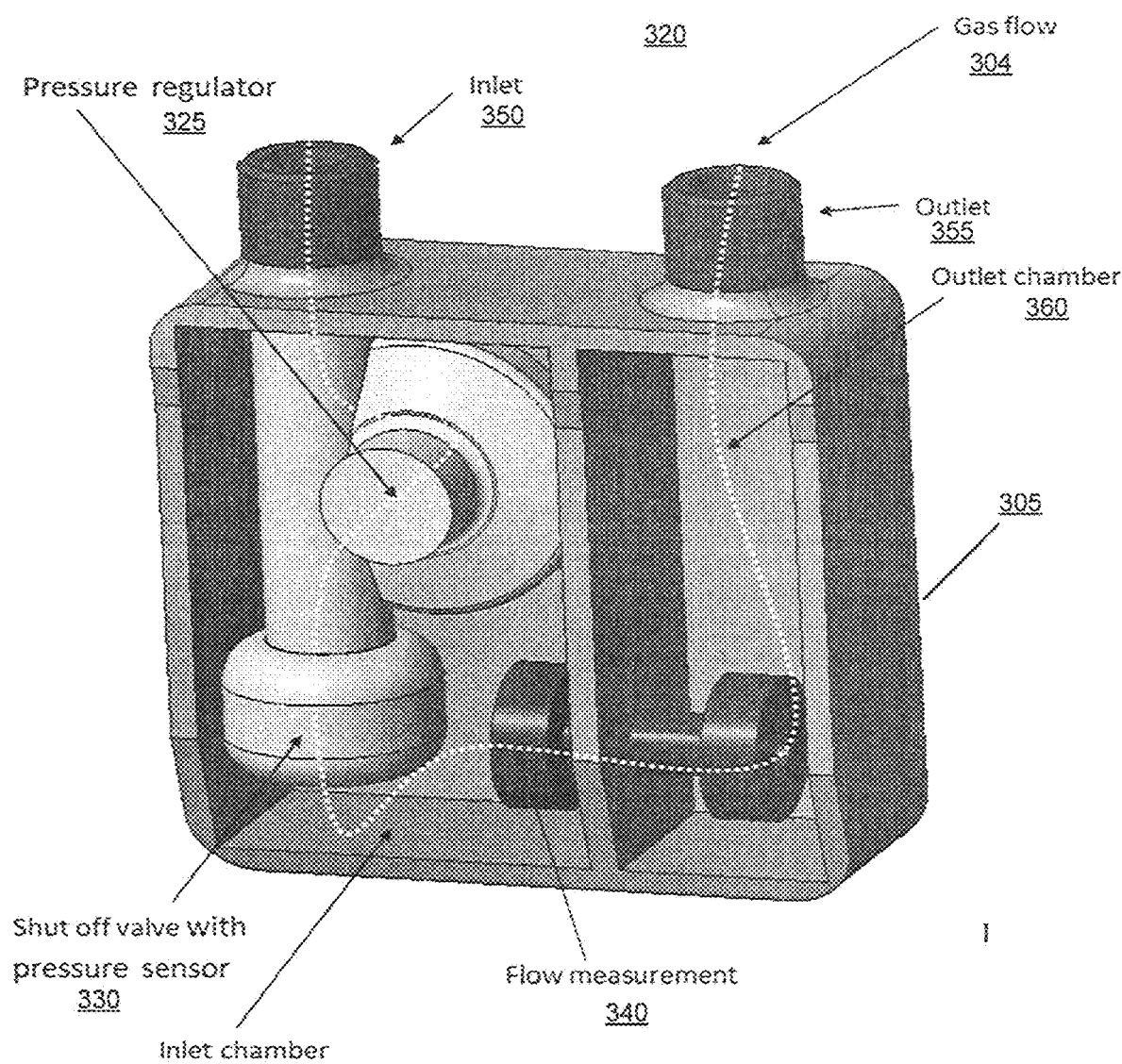
FIG. 3 is a diagram of a meter without an outer shell revealing the pressure regulator and shut off valve in accordance with some embodiments of the present inventive concept.

Referring now to FIG. 3, a gas meter including a pressure regulator 325 in accordance with some embodiments of the present inventive concept will be discussed. As discussed above, although embodiments of the present inventive concept are discussed with respect to gas meters, embodiments are not limited to this configuration. For example, embodiments of the present inventive concept may be applied to water meters without departing from the scope of the present inventive concept.

As illustrated in FIG. 3, the meter 320 includes a housing 305, a pressure regulator 325, an optional shut off valve with a pressure sensor 330 and a flow measurement device 340. The housing 305 may be made of any material suitable for such a device without departing from the scope of the present inventive concept. As will be discussed further below, the meter housing 305 in addition to the pressure regulator 325 and the optional shut off valve 330, may further include an actuator, electronics and a radio module in communication with the electronics. Thus, in some embodiments, the pressure regulating system includes the pressure regulator 325, the shut off valve 330, the actuator, the electronics and the radio module. Gas meters including a shut off valve are discussed in, for example, commonly assigned U.S. patent Ser. No. 16/275,720 filed on Feb. 14, 2019, the disclosure of which is incorporated herein by reference as if set forth in its entirety.

Referring again to FIG. 3, the dotted line 304 illustrates an example flow of gas which begins at the inlet 350, flows through the pressure regulator 325 and shut off valve 330 into the flow measurement device 340 and the outlet chamber 360 and out through the outlet 355. Thus, while the gas is flowing through the meter, the pressure of the gas is being sensed. This sensed pressure may be used to adjust the pressure of the gas flowing through the meter. For example, in some embodiments, the meter 320 may receive a desired pressure from a remote location. When the sensed pressure does not match the received desired pressure, the meter 320 may adjust the pressure in the meter to match the desired pressure.

It will be understood that although FIG. 3 illustrates a particular flow of gas, embodiments of the present inventive concept are not limited to this configuration. For example, the gas can flow through a flow tube first, then the regulator, then the valve and the like without departing from the scope of the present inventive concept.

In some embodiments, the meter 320 may be preprogrammed with a particular desired pressure or pressure range. The sensed pressure may be routinely compared with the preprogrammed parameters and adjusted accordingly.

In embodiments including the optional shut off valve 330, when the sensed pressure is sensed to be, for example, dangerously high, the optional shut off valve 330 may be configured to shut off the flow of gas completely.

As discussed above, in some embodiments, the gas meter 320 may receive a signal from a remote location (utility) indicating that the pressure of the gas flow through the meter should not exceed a particular PSI or should be maintained in within a specific PSI range. If the sensed pressure exceeds the threshold or is outside the range, the meter 320 may be configured to automatically adjust the pressure in the meter using the pressure regulator 325, the shut off valve 330 and flow measurement device 340. It will be understood that in some embodiments, the pressure may be adjusted responsive to signals from a remote location and, therefore, the pressure adjustment may not be automatic in all embodiments.

In particular, in some embodiments, the meter 320 may be preprogrammed to operate at a specific pressure or within a specified range of pressures. In these embodiments, the meter 320 may not receive the communication from a remote location (utility) as discussed above. It will be understood that embodiments of the meter 320 illustrated in FIG. 3 are provided as examples only and embodiments of the present inventive concept are not limited thereto. For example, more or fewer elements may be included in meter 320 or elements may be combined without departing from the scope of the present inventive concept. In particular, as discussed above, the shut off valve may not be present in all embodiments of the meter 320.

Figure 4:
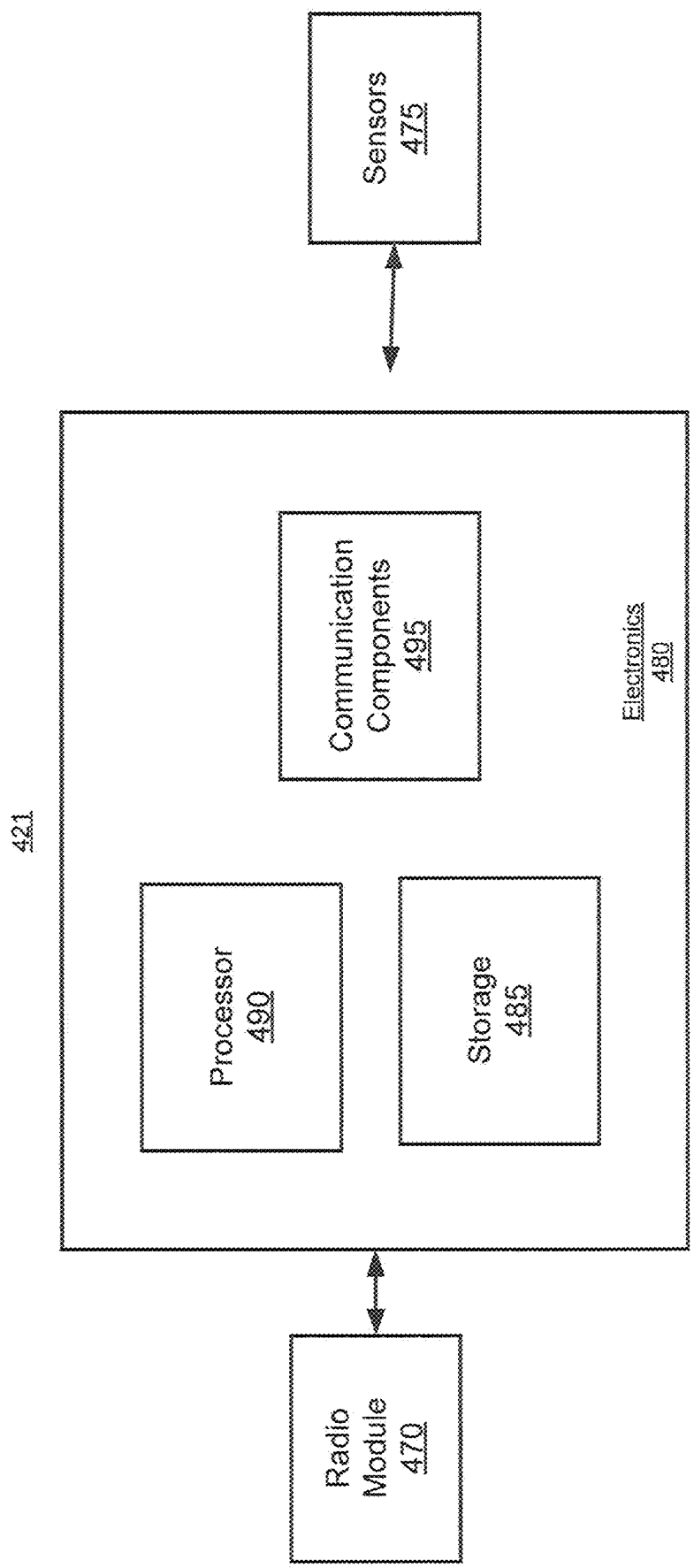
FIG. 4 is a block diagram illustrating a system including a radio module in accordance with some embodiments of the present inventive concept.

Referring now to FIG. 4, a system 421 including a radio module 470 in communication with the meter 320 (not shown) will be discussed. As illustrated, the meter 320 may further include electronics 480 including storage 485, a processor 490 configured to receive and process information from the various sensors 475 (pressure, temperature etc.) in the system 421 and communication components 495. In some embodiments, the electronics 480 are included in the meter 320 as well as the radio module 470 and sensors 475. Although radio module, electronics 480 and sensors 475 are illustrated as separate elements in FIG. 4, these elements may be combined or separated into additional elements without departing from the scope of the present inventive concept. The communication components 495 may facilitate automated, two-way communication between the meter 320 having an Internet protocol (IP) address and a utility company. Thus, the system/device/meter is "smart" having the capability to communicate with other remote devices. It will be understood that FIG. 4 is a simplified block diagram of the electronics 480 and embodiments of the present inventive concept are not limited to the configuration therein.

Thus, in some embodiments, the meter 320 is configured to receive information from an actuator, a temperature sensor, a pressure sensor and the like, process and/or store the information therein (or externally) and communicate the information to a remote location via the radio module 470. For example, the radio module 470 may communicate with a utility's network over Sensus' FlexNet. In some embodiments, the radio module 470 may be included in the meter 320 and in some embodiments, it may be separate without departing from the scope of the present inventive concept.

As discussed above, the "pressure regulating system" refers to any combination of the elements included in FIGS. 3 and 4 and elements within the housing 305 are part of the meter 320. In embodiments where the radio module 470 is included in the housing 305, the radio module 470 would be considered part of both the "pressure regulating system" and the meter.

Referring again to FIG. 3, gas flows in the meter 320, in through the INLET 350 and out through the OUTLET 355. As will be discussed, embodiments of the present inventive concept allow the pressure of the fluid flowing through the meter 320 to be regulated from a remote location, in contrast to conventional systems discussed above. In particular, the meter 320 includes an integrated pressure regulator 325 inside the housing 305 of the meter 320. The pressure regulator 325 may be used to increase and/or decrease pressure remotely responsive to information received from other devices. As illustrated, the pressure regulator is coupled to a pressure sensor that is linked to the electronics. The pressure of the water/gas flowing through meter may be sensed and communicated to the electronics 480. It will be understood that the information received at the electronics 480 is not limited to pressure information. As discussed above, other sensed/measured information related to the meter 320 may be received from sensors, such as a temperature sensor, without departing from the scope of the present inventive concept. In some embodiments, the system may be battery driven or powered by an external power source without departing from the scope of the presnet inventive concept. Furthermore, the electronics 480 may be removed from the meter 320 and positioned in a remote location in some embodiments. In these embodiments, the meter 320 may operate responsive to signals from the remote location.

The electronics 380 communicate with the radio module 470. The sensed/measured information communicated to the electronics 480 may be processed (490, FIG. 4) and communicated to a remote device using the radio module 470. Thus, in accordance with some embodiments discussed herein, the pressure in the meter may be increased/decreased from a remote location if, for example, the gas pressure sensed is not at a desired level.

In some embodiments, systems discussed herein may combine the following features in one: a pressure regulator, a shut off valve; a pressure sensor, and optional temperature sensor. All elements in the system may be capable of communicating with the radio module 470, i.e. sending and receiving data including pressure and temperature information. Thus, the system may be controlled remotely, for example, desired values can be set and read remotely.

Figure 5:
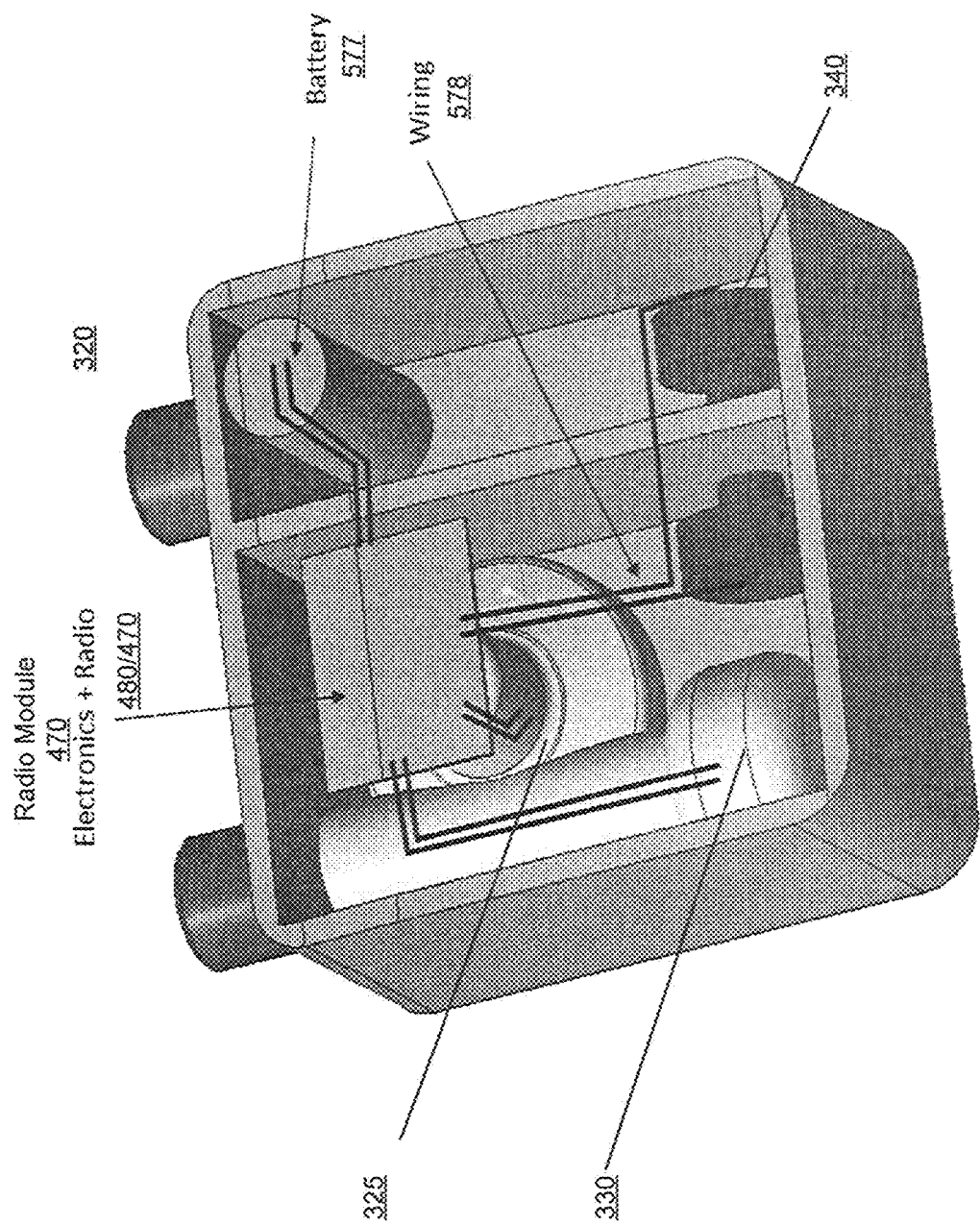
FIG. 5 is a diagram illustrating a meter including a pressure regulator and an electronics/radio board in accordance with some embodiments of the present inventive concept.

Referring now to FIG. 5, a diagram of a meter 320 having the integrated pressure regulator 325 and a radio module 470 in accordance with some embodiments of the present inventive concept will be discussed. As illustrated in FIG. 5, the meter 320 includes a radio module 470, which in this embodiment includes both the electronic 480 and radio 470 discussed above with respect to FIG. 4. It will be understood that the radio module 470 is shown in a position above the pressure regulator 325, however, embodiments are not limited to this configuration. FIG. 5 also illustrates an optional battery 577 that provides power to the radio module 470 and wiring 578 that connects the radio module 470 to the various components of the meter 320. Including the radio module 470 in the meter 320 as shown and discussed herein allows the meter 320 to communicate with remote devices and be operated remotely responsive to commands therefrom.

As illustrated, FIG. 5 illustrates a meter 320 including a pressure regulator 325, an optional shut off valve 330, a flow measurement device 340, a battery 577 and a printed circuit board assembly (PCBA) for the radio module 470 including the electronic 480. FIG. 5 is provided for example only and, therefore, embodiments of the present inventive concept are not limited to the configuration shown therein.

Figure 6:
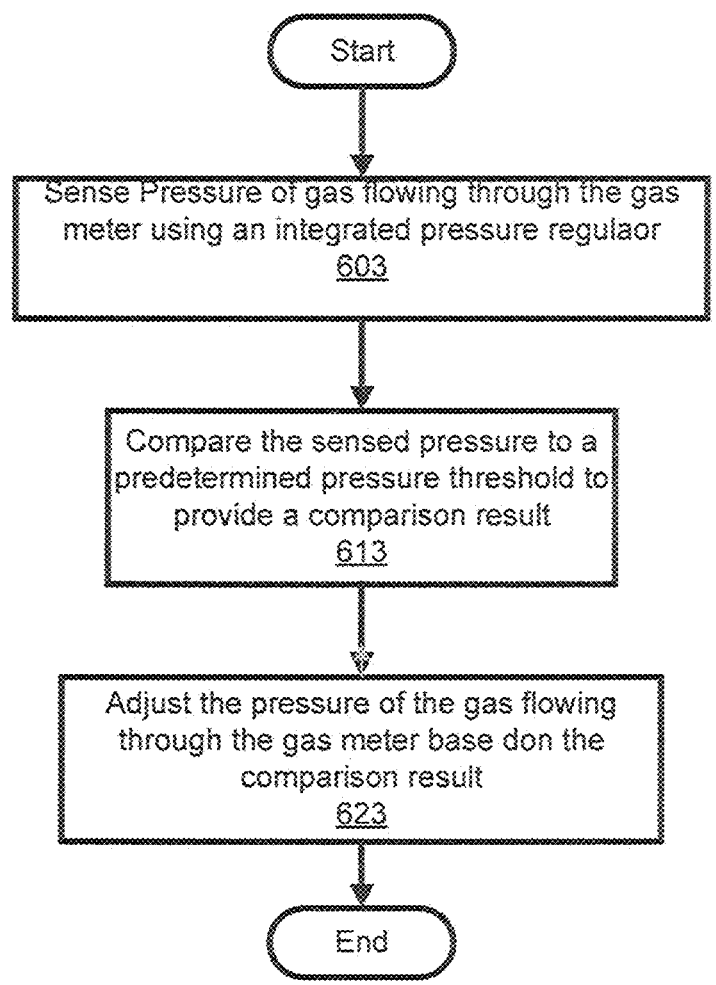
FIG. 6 is a flowchart illustrating operations of a meter including a pressure regulator in accordance with some embodiments of the present inventive concept.
Figure 7:
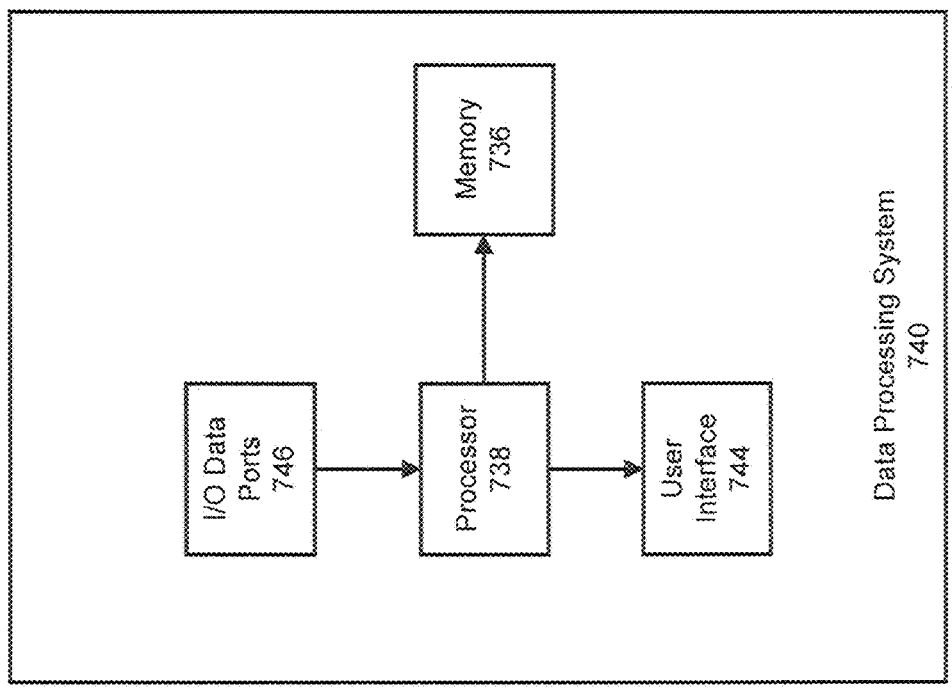
FIG. 7 is a block diagram illustrating a data processing system for use in accordance with some embodiments of the present inventive concept.

Referring now to FIG. 6, a flowchart illustrating operations for adjusting pressure in a gas meter having an integrated pressure regulator will be discussed. As illustrated in FIG. 6, operations begin at block 603 by sensing pressure of gas flowing through a gas meter using the integrated pressure regulator. The pressure may be sensed using one or more pressure sensors. Furthermore, additional parameters may also be sensed without departing from the scope of the present inventive concept. For example, temperature sensors may be used to sense temperature.

The sensed pressure (and any other sensed parameter) may be compared to a predetermined pressure threshold to provide a comparison result (block 613). The predetermine pressure threshold may be received by a signal from a remote location in some embodiments. In further embodiments, the predetermined pressure threshold or pressure range may be preprogramed in the gas meter.

The pressure of the gas flowing through the gas meter may be adjusted based on the comparison result (block 623). The pressure may be adjusted automatically based on the comparison or the comparison result may be provided to a remote location and the remote location may provide instructions to adjust the pressure.

Adjusting the pressure of the gas flowing through the gas meter (block 623) may include increasing gas pressure of the gas flowing through the gas meter, decreasing gas pressure of the gas flowing through the gas meter; and shutting off the gas flowing through the gas meter using an integrated shut off valve.

As discussed above, some aspects of the present inventive concept may be implemented by a data processing system. The data processing system may be included in any of the devices discussed herein without departing from the scope of the present inventive concept. For example, the data processing system may be included in the electronics of the meter device as discussed above, in a remote location or both. Exemplary embodiments of a data processing system 740 configured in accordance with embodiments of the present inventive concept will be discussed with respect to FIG. 7. The data processing system 740 may include a user interface 744, including, for example, input device(s) such as a keyboard or keypad, a display, a speaker and/or microphone, and a memory 736 that communicate with a processor 738. The data processing system 740 may further include I/O data port(s) 746 that also communicates with the processor 738. The I/O data ports 746 can be used to transfer information between the data processing system 740 and another computer system or a network using, for example, an Internet Protocol (IP) connection. These components may be conventional components such as those used in many conventional data processing systems, which may be configured to operate as described herein.

As discussed briefly above, pressure for gas meter lines is still set manually on the pressure regulator, this all manual process is expensive. Embodiments of the present inventive concept provide a meter configured to allow pressure to be regulated automatically and/or responsive to a single sent from a remote location. Having the ability to regulate gas pressure regulated automatically and/or remotely may reduce response time and possibly increase safety. Furthermore, regulating the pressure efficiently can reduce overall operation cost for the gas supplier as gas pressure can be monitored, adjusted down and/or up as needed.

In the drawings and specification, there have been disclosed typical preferred embodiments of the invention and, although specific terms are employed, they are used in a generic and descriptive sense only and not for purposes of limitation, the scope of the invention being set forth in the following claims.

What is claimed is:

1. An integrated gas meter comprising:
   a single meter housing;
   a radio module integrated in the meter housing;
   a pressure regulator integrated with the meter housing and in communication with the radio module, wherein the pressure regulator adjusts pressure of gas flowing through the gas meter responsive to a signal received from a remote location using the radio module or automatically based on a predetermined pressure threshold programmed into the gas meter; and
   a shut off valve integrated into the meter housing and coupled to a pressure sensor in the meter housing, wherein the shut off valve turns the gas meter off and on remotely responsive to sensed pressure or the signal from the remote location communicated using the radio module,
   wherein the gas meter is positioned at a residential or commercial customer location and is a flow meter that measures a volume of gas flowing through the gas meter that is being consumed by a residential or commercial customer; and
   wherein the radio module, pressure regulator, shut off valve and pressure sensor are all integrated into the single meter housing.

2. The gas meter of claim 1, further comprising a pressure sensor in the meter housing associated with the pressure regulator that senses pressure of gas flowing through the gas meter, wherein the pressure regulator automatically adjusts the pressure of gas flowing through the gas meter based on a comparison of the sensed pressure of the gas flowing through the gas meter and the predetermined pressure threshold.

3. The gas meter of claim 2, further comprising:
   an electronics module integrated in the meter housing, wherein the electronics module receives sensor information including the sensed pressure and processes the received sensor information,
   wherein the radio module receives the processed sensor information from the electronics module, communicates the processed sensor information to the remote location and receives pressure adjustment information from the remote location,
   wherein the pressure regulator uses the received pressure adjustment information to adjust gas pressure in the gas meter.

4. The gas meter of claim 3, further comprising a temperature sensor integrated in the meter housing and in communication with the electronics module,
   wherein the electronics module receives temperature information from the temperature sensor and processes the received temperature information along with the received pressure information.

5. The gas meter of claim 3, wherein the electronics module uses the received pressure adjustment information to instruct the pressure regulator to one of increase pressure of the gas flowing through the gas meter; decrease pressure of the gas flowing through the gas meter; and shut off the gas flowing through the gas meter.

6. The gas meter of claim 3, wherein the electronic module stores the received pressure information and processes the received pressure information to provide the processed pressure information to the remote location via the radio module.

7. A pressure regulating system comprising:
   a single gas meter housing;
   a radio module integrated in the gas meter housing;
   a pressure regulator integrated with the gas meter housing and in communication with the radio module;
   a pressure sensor associated with the pressure regulator and integrated with the gas meter housing, wherein the pressure sensor senses pressure of gas flowing through a gas meter;
   an electronics module that receive sensor information including the sensed pressure and processes the received sensor information, wherein the pressure regulator automatically adjusts the pressure of gas flowing through the gas meter based on a comparison of the sensed pressure of the gas flowing through the gas meter and a predetermined pressure threshold;
   a shut off valve coupled to the pressure sensor, the shut off valve configured to turn the gas meter off and on remotely responsive to the sensed pressure or a signal from a remote location,
   wherein the gas meter is positioned at a residential or commercial customer location and is a flow meter that measures a volume of gas flowing through the gas meter that is being consumed by a residential or commercial customer; and
   wherein the radio module, pressure regulator, electronics module, shut off valve and pressure sensor are all integrated into the single gas meter housing.

8. The pressure regulating system of claim 7, wherein the predetermined threshold is a predetermined threshold programmed into the gas meter or is received in a signal from a remote location.

9. The pressure regulating system of claim 7, wherein the radio module receives the processed sensor information from the electronics module, communicates the processed sensor information to a remote location and receives pressure adjustment information from the remote location, wherein the pressure regulator uses the received pressure adjustment information to adjust gas pressure in the gas meter.

10. The pressure regulating system of claim 7, further comprising a temperature sensor integrated in the meter housing, wherein the electronics module receives temperature information from the temperature sensor and processes the received temperature information along with the pressure information.

11. A method of adjusting pressure in a gas meter having an integrated pressure regulator and radio module in a single gas meter housing, the method comprising:
   sensing pressure of gas flowing through a gas meter using a pressure sensor;
   receiving a predetermined pressure threshold from a remote location using the integrated radio module;
   comparing the sensed pressure to a predetermined pressure threshold to provide a comparison result;
   adjusting the pressure of the gas flowing through the gas meter based on the comparison result, using the pressure regulator;
   and turning the gas meter off and/or on remotely responsive to the sensed pressure or a signal from a remote location, using a shut off valve;
   wherein the gas meter is positioned at a residential or commercial customer location and is a flow meter that measures a volume of gas flowing through the gas meter that is being consumed by a residential or commercial customer; and
   wherein the radio module, the pressure regulator, the pressure sensor and the shut off valve are integrated into the single gas meter housing.

12. The method of claim 11, wherein adjusting the pressure of the gas flowing through the gas meter comprises automatically adjusting the pressure of the gas flowing through the gas meter based on the comparison result of the sensed pressure and the predetermined pressure threshold stored in the gas meter.

13. The method of claim 11, wherein adjusting the pressure of the gas flowing through the gas meter comprises one of:
   increasing gas pressure of the gas flowing through the gas meter;
   decreasing gas pressure of the gas flowing through the gas meter; and
   shutting off the gas flowing through the gas meter using an integrated shut off valve.

14. The method of claim 11, further comprising:
   sensing a temperature in the gas meter using a temperature sensor integrated in the gas meter housing; and
   adjusting the pressure of the gas flowing through the gas meter based on the comparison result and the sensed temperature.

* * * * *